United States Patent [19]

Brandenstein et al.

[11] Patent Number: 4,872,768

[45] Date of Patent: Oct. 10, 1989

[54] SWIVEL BEARING FOR BRAKING DEVICES

[75] Inventors: Manfred Brandenstein, Eussenheim; Roland Haas, Hofheim; Wolfgang Friedrich; Gerhard Herrmann, both of Schweinfurt, all of Fed. Rep. of Germany

[73] Assignee: SKF GmbH, Schweinfurt, Fed. Rep. of Germany

[21] Appl. No.: 275,204

[22] Filed: Nov. 22, 1988

[30] Foreign Application Priority Data

Dec. 11, 1987 [DE] Fed. Rep. of Germany ....... 3742030

[51] Int. Cl.⁴ .............................................. F16C 27/00
[52] U.S. Cl. .................................... 384/223; 384/275; 474/135
[58] Field of Search ............... 384/223, 220, 275, 297, 384/218; 474/135

[56] References Cited

U.S. PATENT DOCUMENTS

| | | | |
|---|---|---|---|
| 4,209,872 | 7/1980 | Maier | 384/220 |
| 4,557,707 | 12/1985 | Thomey | 474/135 |
| 4,678,349 | 7/1987 | Yoshigai | 384/297 |
| 4,698,049 | 10/1987 | Bytzek et al. | 474/135 |

FOREIGN PATENT DOCUMENTS 3590411 9/1986 Fed. Rep. of Germany.

Primary Examiner—Lenard A. Footland
Attorney, Agent, or Firm—Rosen, Dainow & Jacobs

[57] ABSTRACT

In a swivel bearing for a braking device the fixed machine part is provided with a flange which has friction surfaces for damping the swivel motion. A flange sleeve made of sheet metal axially and radially surrounds a flange which adjoins the front side of a sleeve section belonging to the swivel arm. The resulting annular space contains, besides the flange, an axially acting spring washer. The flange sleeve itself may optionally have an axial spring action. The flange sleeve is secured axially and against torsion at the sleeve section by means of a turned edge or similar means. The result is a compact arrangement which does not easily disassemble, even in an unmounted condition.

6 Claims, 3 Drawing Sheets

SWIVEL BEARING FOR BRAKING DEVICES

BACKGROUND OF THE INVENTION

1. Field of the Invention

The invention concerns a swivel bearing for a braking device comprising a fixed internal machine part on which a sleeve section has been rotatably mounted, a spring generating a relative swivel motion between the machine part and the sleeve section and a damping element installed between radial friction surfaces of the sleeve section and the machine part.

2. Description of the Prior Art

A swivel bearing of this type is disclosed in DE 3 590 411 T1. It serves as a bearing for drive belts on engine blocks and comprises a sliding bearing and a tension spring concentric to the sliding bearing. The tension spring tenses an outside sleeve section with a connected swivel arm or idler against the drive belt in the swivel direction. The swivel bearing disclosed in DE 3 590 411 T1 further comprises a friction damper acting in the swivel direction. The friction damper is comprised of various components, and particularly a damping ring which is pushed axially by a spring against the friction surface of a disk. This known swivel bearing comprises a number of complicated components and is therefore more difficult to manufacture. In addition, releasing the central screw which attaches the swivel bearing causes the unit to disassemble into its component parts. This occurs in particular when the entire braking device is attached directly to the engine block without a mounting plate.

SUMMARY AND OBJECTS OF THE INVENTION

The objective of the invention is to create a swivel bearing of the type disclosed above comprising a limited number of easy-to-manufacture components and constituting, when assembled for mounting, a compact unit which is not easily disassembled.

The objective is met according to this invention by providing the internal machine part with a radially outward directed flange having radial friction surfaces. A flange sleeve surrounds the flange axially and radially and is secured axially and against torsion at the sleeve section. At least one of the friction surfaces of the flange has an adjoining damping element.

The internal machine part is directly attached to the engine block with a screw, which serves no other function. The flange, which may optionally constitute a single unit with the machine part, is installed between the front side of the sleeve section and the flange section of the flange sleeve. The flange sleeve is solidly attached axially to the flange section, for example, by pulling the edge of the flange sleeve radially into a groove in the flange section. Consequently, the sleeve section and the internal machine part are axially interlocked without any impediment from relative rotation. The resulting U-profiled space between the flange section and the front of the sleeve section also contains the axially tensed damping elements which act in the swivel direction, so that a compact unit is created with fixed damping capacity and components which cannot be easily lost.

According to a further feature of the invention, the flange sleeve is made of flexible pliable sheet metal and has a flange section under axial spring tension adjoining a damping ring. To achieve a damping action which is constant over a long period, it is useful to tense the damping ring against the friction surface. A simple and inexpensive method to meet this objective is by providing the flange section of the flange sleeve with axial spring action.

Alternatively, in accordance with another feature of the invention, a spring washer with axial action can be mounted between the flange section and the damping ring. In this embodiment, the flange section is radially rigid and a known corrugated washer or disk spring is used.

In a further embodiment in accordance with this invention, the flange section has at its bore edge a sleeve-shaped extension for retaining a spring washer covered with a friction lining in the bore. At least one radially protruding locking element is provided which through adherence or interlocking with the spring washer prevents torsion. For example, the spring washer may be provided with spring tabs protruding axially from the radial plane and supported by the flange section of the flange sleeve. The radial annular surface of the spring washer may be covered with a friction lining which adjoins the friction surface of the flange of the machine part. To provide security against torsion, a sleeve-shaped extension which protrudes from the edge of the flange section is provided. Radial projections distributed over the circumference of the flange section project into corresponding recesses of the spring washer. Alternatively, when there is less friction power, torsion may be avoided or minimized by providing interlocking projections at the internal edge of the spring washer.

In a further embodiment of the invention, the internal machine part has a surface area which serves as a sliding surface. In this embodiment, at least the surface area of the internal machine part which serves as a slide bearing and the radial friction surface of the flange are covered with a synthetic slideway lining, for example, a thin teflon coat. It is practical to subject the entire machine part to dip coating to simplify coating. Teflon is an appropriate slide bearing and damping material. A swivel bearing manufactured according to these features requires particularly few components.

BRIEF DESCRIPTION OF THE DRAWINGS

Further objects and advantages of the invention will appear from the following description as well as from the accompanying drawings which illustrate various embodiments of the invention. It will be understood that the invention is not limited to the embodiments described and that the drawings are for purposes of illustration only and are not intended as a definition of the limits of the invention. Similar reference numerals refer to similar elements throughout the several views.

DETAILED DESCRIPTION OF PREFERRED EMBODIMENTS

Figure 1:
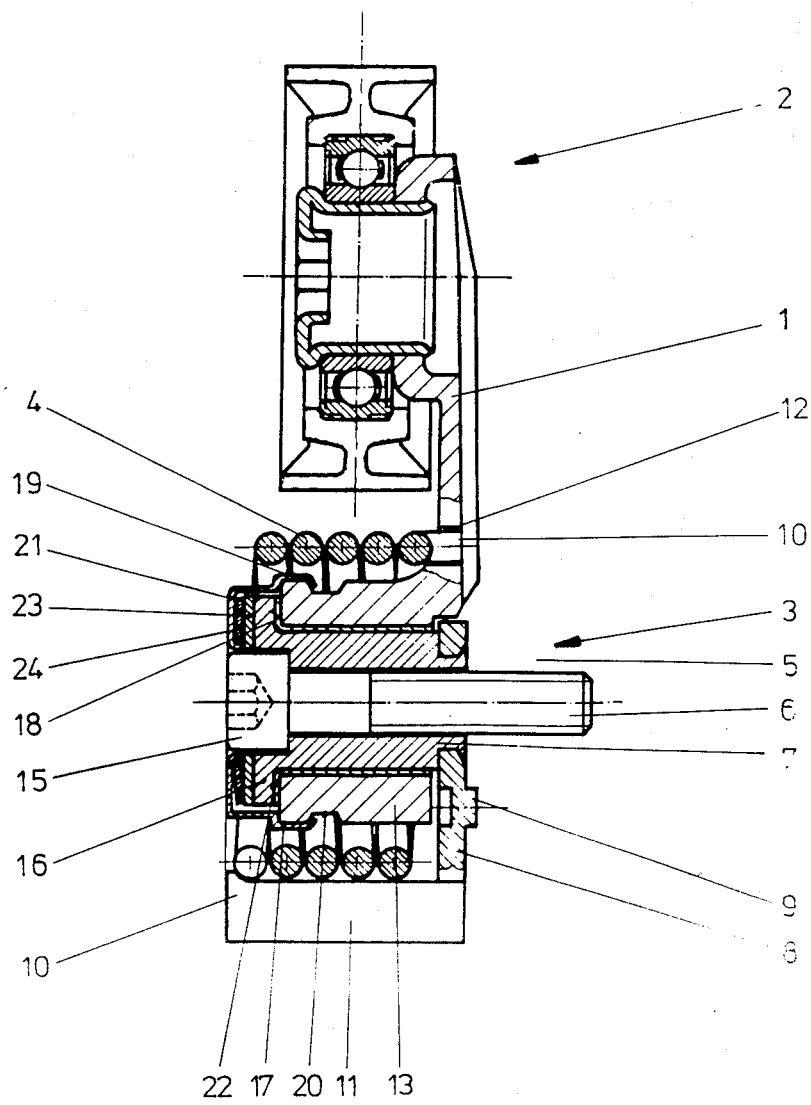
FIG. 1 is a longitudinal sectional view of a braking device with a flange sleeve and damping ring.

The braking device shown in FIG. 1 comprises a swivel arm 1 having an idler 2 for a drive belt (not shown here) at one end and a swivel bearing 3 at the other end. The swivel bearing 3 is surrounded by a helical spring 4 which tenses the swivel arm 1 or the idler 2 in the swivel direction against a fixed internal machine part, gudgeon 7, fastened to an engine block 5 by means of a screw 6. Attached to the gudgeon 7 is a disk 8 with a locking pin 9 extending into the engine block 5, and a protruding holder 11 which retains one end of the helical spring 4. The other end of the helical spring 4 fits into a bore 12 of the swivel arm 1. Between the gudgeon 7 and a sleeve section 13 of the swivel arm 1, a thin-walled slide bearing bushing 14 is provided. At the head of the screw 15, the slide bearing bushing 14 has been reshaped in a radial direction. The slide bearing bushing 14 is axially adjoined by a flange 16 forming one piece with the gudgeon 7 and is axially and radially surrounded by a flange sleeve 17. The flange sleeve 17, which interlocks axially at the front 18 of the sleeve section 13, has a radially pulled-in rim 19 which extends into a groove 20 of the sleeve section 13. A damping ring 23 and an axially acting spring washer 24 have been inserted and secured against torsion between flange section 21, which extends up to the screw head 15, and the external friction surface 22 of the flange 16. As a result, all components are safely kept together even when the screw 6 is released.

Figure 2:
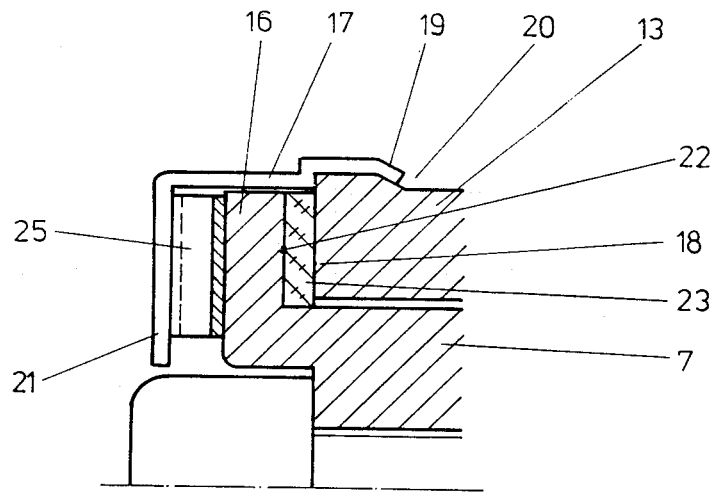
FIG. 2 is an enlarged section of a flange sleeve with damping ring and corrugated washer.

In the embodiment shown in FIG. 2, the flange sleeve 17 is shown in greater detail. Between the front 18 of the sleeve section 13 and the right friction surface 22 of the flange 16 of the gudgeon 7, a damping ring 23 of friction material has been inserted. The axial tensing occurs by means of a corrugated washer 25 inserted between the left friction surface 22 of the flange 16 and flange section 21.

Figure 3:
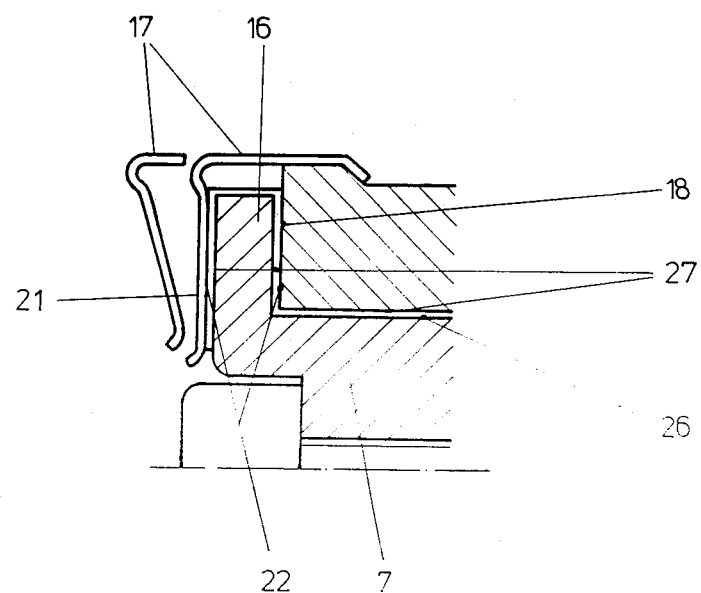
FIG. 3 is an enlarged section of an axially springactivated flange sleeve with coated flange.

FIG. 3 shows an embodiment of the invention having strong spring action. In this embodiment, the flange 16 and the surface area 26 of the gudgeon 7 are covered with a slideway lining 27. The flange sleeve 17 is provided with a flange section 21 having axial spring action which generates the required axial spring tension against the friction surfaces 22 of flange 16. To clarify the action mechanism, FIG. 3 shows the spring action in detail, with flange sleeve 17 left out. Flange 16 with its coated friction surfaces 22 is axially tensed between the front 18 of the sleeve section 13 and the flange section 21 due to the spring action of the flange sleeve 17.

Figure 4:
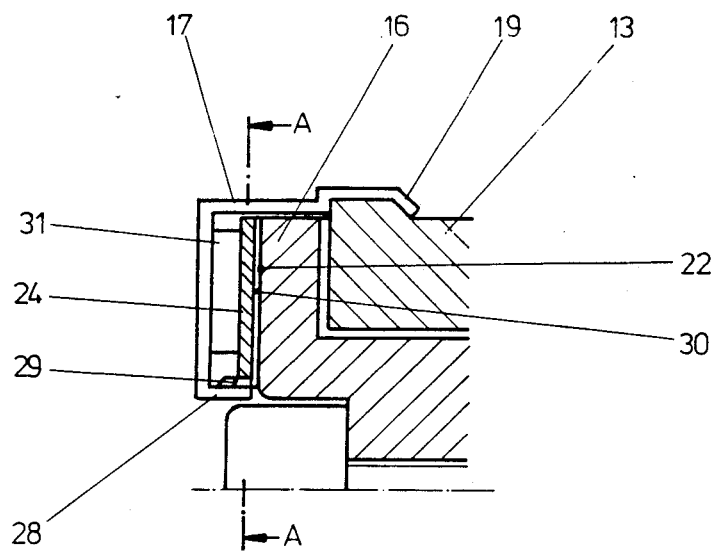
FIG. 4 is an enlarged section of a flange sleeve with sleeve-shaped extension and coated spring washer.
Figure 5:
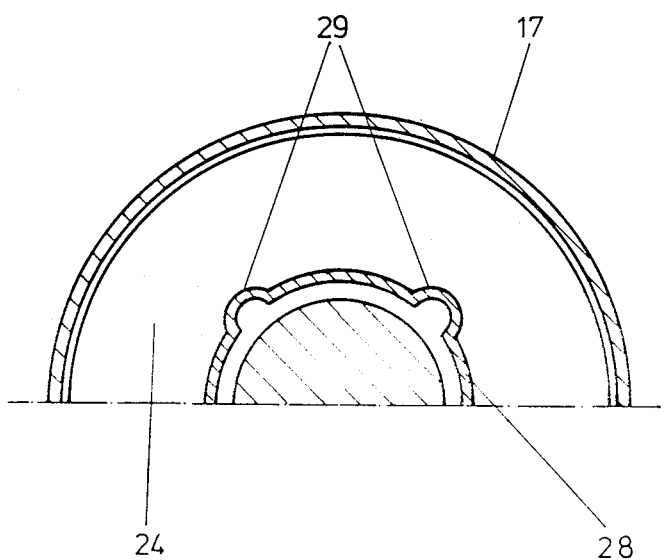
FIG. 5 is a cross-sectional view along line A—A of FIG. 4.

In the embodments shown in FIGS. 4 and 5, a sleeve-shaped extension 28 extending from the radial internal rim of the flange section 21 is provided. Four locking elements 29 of the same material and pointing radially outward are distributed over the circumference of the sleeve-shaped extension 28. They fit into corresponding recesses of a spring washer 24 and prevent the washer from twisting. The spring washer 24 is covered with a synthetic friction lining 30 on its radial surface facing the friction surface 22 of the flange 16. On the other side, spring tabs 31, jutting axially from the material, are distributed over the circumference and supported by the internal lateral surface of the flange section 21. The spring tabs 31 generate tension against the friction surface 22. As in the previous embodiments, the flange sleeve 17 is fastened to the sleeve section 13 by pulling rim 19 of flange sleeve 17 around sleeve section 13.

FIG. 5 is a cross-sectional view along line A—A of FIG. 4, presenting in great detail the locking elements 29 interacting with the spring washer 24.

What is claimed is:

1. A swivel bearing for a braking device comprising a fixed internal machine part, a sleeve section rotatably mounted to said fixed internal machine part, a spring coupled between said machine part and said sleeve section for generating a relative swivel motion between said machine part and said sleeve section, and a damping element installed, a portion of said sleeve section and said machine part having radial friction surfaces, said internal machine part comprising a flange directed radially outward and having radial friction surfaces, a flange sleeve surrounding said flange axially and radially, means for securing said machine part axially and against torsion at said sleeve section, and said damping element adjoining at least one of the friction surfaces of the flange.

2. A swivel bearing according to claim 1 wherein said flange sleeve is made of flexible pliable sheet metal, said damping element comprises a damping ring and said flange section is axially spring-tensed against said damping ring.

3. A swivel bearing according to Claim 1 wherein said damping element comprises a damping ring and an axially acting spring washer is provided between the flange section and the damping ring.

4. A swivel bearing according to Claim 3 wherein said spring washer is covered with a friction lining.

5. A swivel bearing according to Claim 3 wherein said flange has at its bore edge a sleeve-shaped extension for retaining said spring washer in said bore, said bearing further comprising at least one radially protruding locking element being fixedly positioned with said spring washer to prevent torsion therebetween.

6. A swivel bearing according to any one of Claims 1 to 5 wherein said internal machine part has a surface area which serves as a sliding surface and wherein said sliding surface and said radial friction surfaces of said flange are covered with a slideway lining of a synthetic material.

* * * * *